(12) United States Patent
Zhang

(10) Patent No.: US 12,075,146 B2
(45) Date of Patent: Aug. 27, 2024

(54) LENS MODULE AND ELECTRONIC DEVICE USING THE SAME

(71) Applicant: Rayprus Technology (Foshan) Co., Ltd., Foshan (CN)

(72) Inventor: Long-Fei Zhang, Guangdong (CN)

(73) Assignee: Rayprus Technology (Foshan) Co., Ltd., Foshan (CN)

( * ) Notice: Subject to any disclaimer, the term of this patent is extended or adjusted under 35 U.S.C. 154(b) by 85 days.

(21) Appl. No.: 18/072,575

(22) Filed: Nov. 30, 2022

(65) Prior Publication Data

US 2024/0121492 A1    Apr. 11, 2024

(30) Foreign Application Priority Data

Oct. 9, 2022    (CN) .......................... 202211227878.X

(51) Int. Cl.
     *H04N 23/55*      (2023.01)
     *H04N 23/54*      (2023.01)

(52) U.S. Cl.
     CPC ............. *H04N 23/55* (2023.01); *H04N 23/54* (2023.01)

(58) Field of Classification Search
     CPC .............................. H04N 23/54; H04N 23/55
     USPC ......................................................... 348/374
     See application file for complete search history.

(56) References Cited

U.S. PATENT DOCUMENTS

| | | | | |
|---|---|---|---|---|
| 8,026,947 B2* | 9/2011 | Okamoto | ............... | H04N 23/54 348/374 |
| 10,567,625 B2* | 2/2020 | Chen | ...................... | H04N 23/55 |
| 11,711,891 B2* | 7/2023 | Cheng | ................... | H05K 3/4691 348/294 |
| 11,885,955 B2* | 1/2024 | Zhang | ................... | H05K 3/4691 |
| 2009/0091632 A1* | 4/2009 | Okamoto | ............... | H04N 23/54 348/208.7 |
| 2015/0334864 A1* | 11/2015 | Feng | ................... | G06K 7/10821 361/730 |
| 2017/0273171 A1* | 9/2017 | Codd | .................... | H04N 25/617 |
| 2018/0063941 A1* | 3/2018 | Kang | ..................... | H05K 1/028 |
| 2018/0113378 A1* | 4/2018 | Wang | ..................... | G03B 17/12 |
| 2018/0288296 A1* | 10/2018 | Wang | ................... | G02B 13/004 |
| 2019/0041727 A1* | 2/2019 | Wang | ..................... | G03B 17/02 |
| 2019/0141224 A1* | 5/2019 | Park | ........................ | H04N 23/54 |
| 2020/0012068 A1* | 1/2020 | Lim | ........................ | H05K 1/181 |
| 2020/0137272 A1* | 4/2020 | Ding | ..................... | H04N 23/54 |
| 2020/0161289 A1* | 5/2020 | Chen | ..................... | H01L 24/95 |
| 2021/0215903 A1* | 7/2021 | Rho | ........................ | G03B 13/36 |
| 2022/0011565 A1* | 1/2022 | Zhang | ................... | H04N 23/57 |
| 2022/0408552 A1* | 12/2022 | Cheng | ................... | H04N 23/54 |
| 2023/0098815 A1* | 3/2023 | Cho | ........................ | H04N 23/54 348/374 |

* cited by examiner

*Primary Examiner* — Pritham D Prabhakher

(74) *Attorney, Agent, or Firm* — ScienBiziP, P.C.

(57) ABSTRACT

A lens module includes a circuit board, a photoelectric sensor, a lens assembly, and a supporting member. The circuit board comprises two hard boards and a soft board, a channel is formed between the two hard boards, and the soft board is connected to the two hard boards. The photoelectric sensor is located in the channel, and the lens assembly is connected to the side of the two hard boards away from the soft board. The supporting member is attached to the circuit board. An electronic device is also disclosed. The height of the lens module is reduced, so decreasing the size of the lens module and blocking the entry of contaminants and foreign bodies into the channel.

18 Claims, 6 Drawing Sheets

LENS MODULE AND ELECTRONIC DEVICE USING THE SAME

TECHNICAL FIELD

The present disclosure relates to the field of electronic and optical devices, in particular to a lens module and an electronic device.

BACKGROUND

In the existing lens module, the sensor is directly set on the circuit board, which increases/decreased the total height of the sensor and the circuit board. The lens module has a larger size and the screen occupation of the lens module base is low, affecting the image effect of the electronic device.

Therefore, improvement is desired.

SUMMARY OF THE DISCLOSURE

The embodiment of the present disclosure aims to provide a lens module and an electronic device. The present disclosure can reduce the size of the lens module to increase the screen-to-body proportion of the electronic device.

The embodiment of the present disclosure provides a lens module, the lens module includes a circuit board, a sensor, a lens assembly and a supporting member. The circuit board includes two hard boards and a soft board. The two hard boards are spaced along a first direction, and adjacent ends of the two hard boards form a channel. Each hard board includes a first surface and a second surface, the first surface and the second surface are relatively arranged in a second direction, and the soft board is connected to the first surface of the two hard boards across the channel. The sensor is located in the channel and is connected to a side of the soft board towards the channel. The lens assembly is connected to the second surface of the two hard boards, the lens assembly and the sensor are arranged in the second direction, and the first direction is perpendicular to the second direction. The supporting member is connected to the circuit board, the supporting member comprises a first supporting portion, a second supporting portion, and a third supporting portion, the first supporting portion is connected to a side of the soft board away from the first surface, and the second supporting portion is connected to a side of the first supporting portion and extends into the channel. The third supporting portion is connected from other side of the first supporting portion and extends into the channel, and the sensor is arranged between the second supporting portion and the third supporting portion.

The embodiments of the present disclosure include the channel being formed by two spaced hard boards in the above lens module, and the sensor located in the channel. Compared with the existing lens module, the module height of the lens module in the second direction Z is reduced, thereby reducing the size of the lens module, at the same time, the supporting member is arranged to wrap the sensor on the soft board, reducing the risk of foreign matter from outside the circuit board entering the channel.

In some embodiments, the first supporting portion comprises a first side surface and a second side surface, the first side surface and the second side surface are arranged in a third direction, the second supporting portion is connected to the first side surface, the third supporting portion is connected to the second side surface, and the third direction is perpendicular to the first direction and the second direction.

In some embodiments, the first side surface defines a first groove recessed toward the second side surface, one end of the second supporting portion is connected to a groove wall of the first groove, and other end of the second supporting portion extends toward the channel. One end of the second supporting portion far from the first supporting portion is exposed outside the channel, the second side surface defines a second groove recessed toward the first side surface, and one end of the third supporting portion is connected to a groove wall of the second groove, the other end of the third supporting portion extends toward the channel, and one end of the third supporting portion away from the first supporting portion is exposed outside the channel.

In some embodiments, the second supporting portion and the third supporting portion are located in the channel.

The embodiment of the disclosure includes the second supporting portion being connected to the first groove, the third supporting portion connected to the second groove, and the second supporting portion and the third supporting portion extending into the channel, so that the second supporting portion faces the side of the third supporting portion, the side of the third supporting portion faces the side of the second supporting portion, and the opposite side of the two hard boards wrap around the four peripheral sides of the sensor. This reduces the size of the lens module in the third direction, at the same time, the sensor in the channel is protected and external foreign matter entering the channel to pollute the sensor is blocked.

In some embodiments, the lens module further comprises a first connecting member, the first connecting member is arranged between the lens assembly and the hard board to connect the lens assembly and the hard board, the first connecting member defines a through hole to connect the channel, and the through hole is configured to enable the sensor to transmit signals to the lens assembly.

The technical effect included in the embodiment of the present disclosure includes the sensor receiving the optical signal passing through the lens assembly by setting a through hole on the first connecting member, the optical signal being converted into an electrical signal to generate an image.

In some embodiments, a portion of a hole wall of the through hole close to the lens assembly protrudes to form a holding portion, and one end of the second supporting portion and the third supporting portion far from the first supporting portion is held in the holding portion.

The embodiment of the present disclosure includes the holding portion being set at the part of the through hole close to the lens assembly, when the second supporting portion and the third supporting portion pass through the channel and extend into the first connecting member to support the holding portion, they wrap the sensor inside the channel.

In some embodiments, the lens assembly includes a holder and one or more optic lenses, the holder is connected to the hard board through the first connecting member, the optic lens is arranged on one side of the holder facing the hard board, and the camera lens and the optic lens are arranged in a second direction.

In some embodiments, the lens module further includes a second connecting member, the second connecting member is arranged between the sensor and the soft board for connecting the sensor and the soft board.

The embodiment of the present disclosure includes the lens assembly being connected to the hard board by setting a second connecting member, so that the lens assembly is closer to the hard board, thus reducing the mounting height of the lens assembly in the second direction, thereby reducing the size of the lens module.

In some embodiments, the first supporting portion, the second supporting portion and the third supporting portion are integrally formed.

The embodiment of the present disclosure includes the first supporting portion, the second supporting portion, and the third supporting portion being set in an integrated structure to improve the strength of support of the supporting portion, thereby improving the mechanical strength of the circuit board.

The present disclosure also provides an electronic device including the lens module.

In the above lens module, the channel is formed by two spaced hard boards, and the sensor is located in the channel. Compared with the existing lens module, the module height of the lens module in the second direction Z is reduced, thereby reducing the size of the lens module, at the same time, the supporting member is arranged to wrap the sensor on the soft board, blocking foreign matter from outside the circuit board entering the channel.

DETAILED DESCRIPTION

Figure 1:
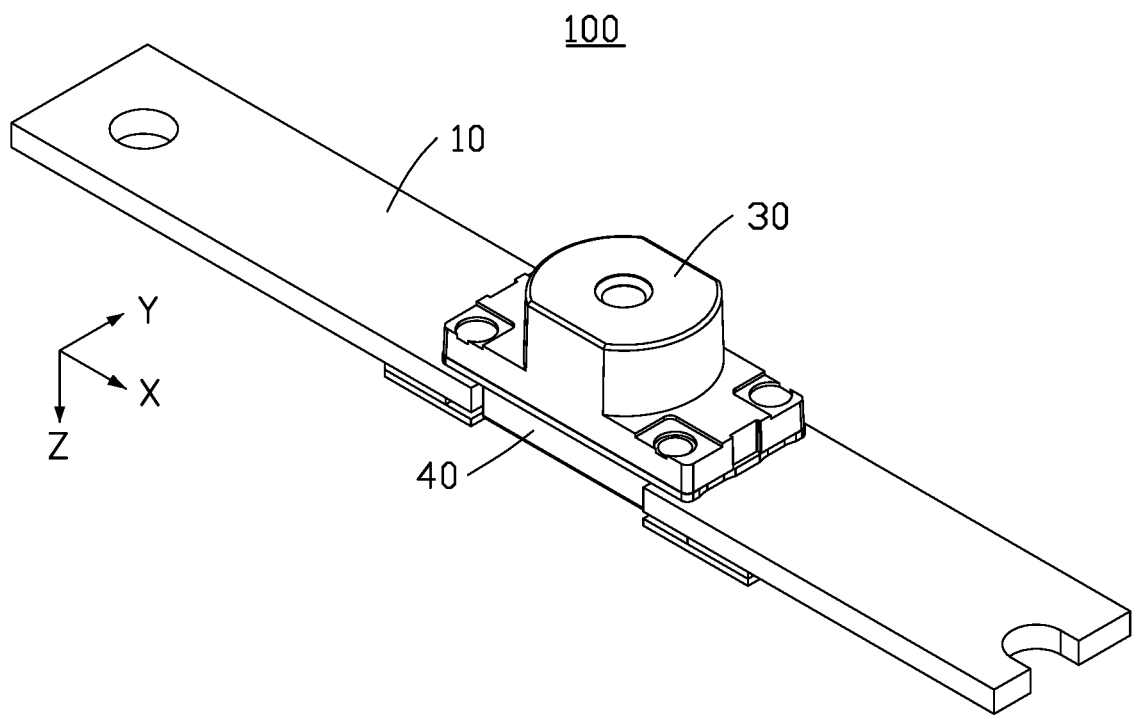
FIG. 1 is a schematic diagram of a lens module according to an embodiment of the present disclosure.

The following will describe the embodiments of the present disclosure in combination with the drawings. Obviously, the described embodiments are only some embodiments of the present disclosure, and not all.

It should be noted that when a component is described as "installed in" another component, it can be directly on the other component or there can be a component between them. When a component is considered to be "set on" another component, it can be directly set on the other component or there may be components between them at the same time.

Unless otherwise defined, all technical and scientific terms used herein have the same meanings as those commonly understood by those skilled in the technical field of the present disclosure. The terms used in the specification of the present disclosure herein are only for the purpose of describing specific embodiments and are not intended to limit the present disclosure. The term "and/or" as used herein includes any and all combinations of one or more related listed items. The terms "vertical", "horizontal", "left", "right", "top", "bottom" and similar expressions used herein are for illustration purposes only and are not intended to limit the present disclosure.

It can be understood that when describing the setting of two components, an included angle between the two components may have a tolerance of ±10% of the included angle which is stated.

The lens module provided by the embodiment of the present disclosure includes a circuit board, a sensor, a lens assembly and a supporting member. The circuit board includes two hard boards and a soft board. The hard board is printed circuit board (PCB), and the soft board is flexible circuit board (FPC). The two hard boards are spaced along a first direction, and a channel is formed between adjacent ends of the two hard boards. Each hard board includes a first surface and a second surface, the first surface and the second surface are arranged in a second direction, and the soft board is connected to the first surfaces of the two hard boards across the channel. The sensor is located in the channel and is connected to a side of the soft board towards the channel. The lens assembly is connected to the second surface of the two hard boards, the lens assembly and the sensor are arranged in the second direction, and the first direction is perpendicular to the second direction. The supporting member is connected to the circuit board, the supporting member comprises a first supporting portion, a second supporting portion, and a third supporting portion. The first supporting portion is connected to a side of the soft board away from the first surface, and the second supporting portion is connected to a side of the first supporting portion and extends into the channel. The third supporting portion is connected from other side of the first supporting portion and extends into the channel, and the sensor is arranged between the second supporting portion and the third supporting portion.

In the above lens module, the channel is formed by two spaced hard boards, and the sensor is located in the channel. Compared with the existing lens module, the module height of the lens module in the second direction Z is reduced, thereby reducing the size of the lens module, at the same time, the supporting member is arranged to wrap the sensor on the soft board, blocking foreign matter from outside the circuit board entering the channel.

Some embodiments of the present disclosure will be described below in combination with the accompanying drawings.

Figure 2:
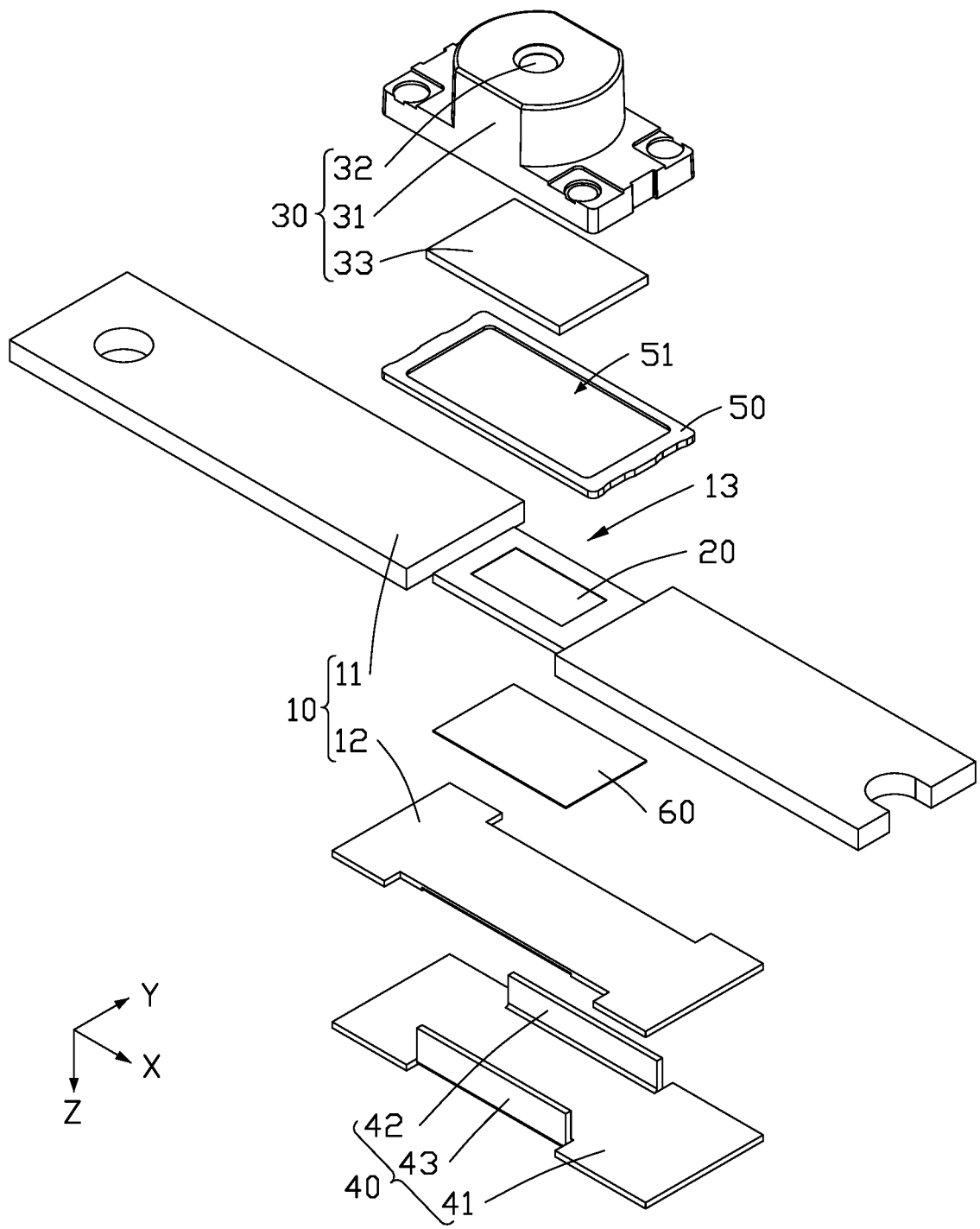
FIG. 2 is a schematic diagram of a lens assembly according to an embodiment of the present disclosure.
Figure 3:
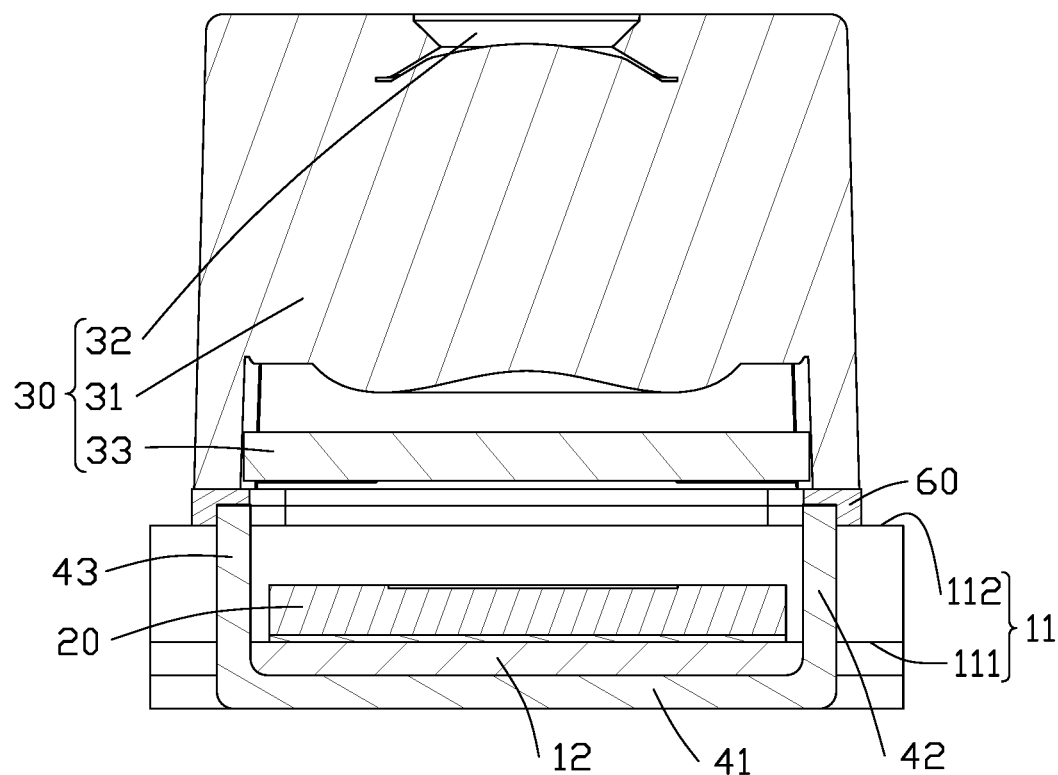
FIG. 3 is a cross sectional diagram of the lens module in FIG. 1 according to an embodiment of the present disclosure.
Figure 4:
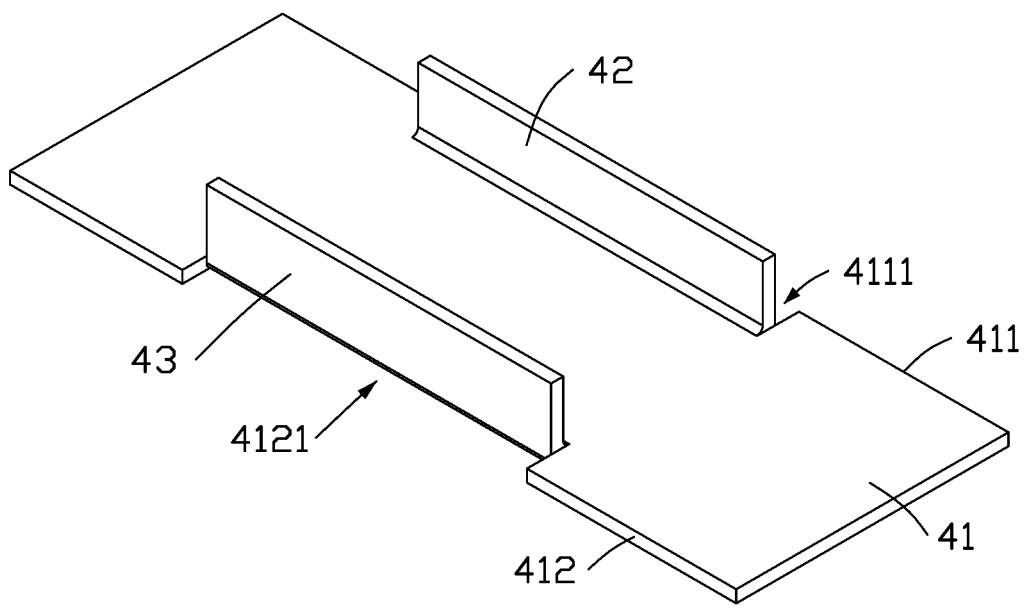
FIG. 4 is a schematic diagram of a supporting member according to an embodiment of the present disclosure.

FIGS. 1-3 illustrate a lens module 100 in accordance with an embodiment of the present disclosure.

The lens module 100 includes a circuit board 10, a sensor 20, a lens assembly 30, and a supporting member 40. The circuit board 10 includes two hard boards 11 and a soft board 12. The two hard boards 11 are spaced along a first direction X, and a channel 13 is formed between the adjacent ends of the two hard boards 11. Each hard board 11 includes a first surface 111 and a second surface 112 (shown in FIG. 3), and the first surface 111 and the second surface 112 are arranged in a second direction Z. The soft board 12 is connected to the first surface 111 of the two hard boards 11 across the channel 13 to electrically connect the two hard boards 11 and the soft board 12. The sensor 20 is located in the channel 13, and the sensor 20 is connected to the side of the soft board 12 facing the channel 13. The lens assembly 30 is connected to the second surface 112 of the two hard boards 11. The lens assembly 30 and the sensor 20 are arranged in the second direction Z, the first direction X is perpendicular to the second direction Z. The supporting member 40 is connected to the circuit board 10, and the supporting member 40 includes a first supporting portion 41, a second supporting portion 42, and a third supporting portion 43. The first supporting portion 41 is connected to the side of the soft board 12 which is away from the first surface 111, the second supporting portion 42 is connected from one side of the first supporting portion 41 and extends into the channel 13, the third supporting portion 43 is connected from the other side of the first supporting portion 41 to the channel 13, and the sensor 20 is arranged between the second supporting portion 42 and the third supporting portion 43. In some embodiments, the sensor may be a light sensor or a photoelectric sensor.

In the above lens module 100, the channel 13 is formed by two spaced hard boards 11, and the sensor 20 is located in channel 13. Compared with the existing lens module, the module height of the lens module 100 in the second direction Z is reduced, thereby reducing the size of the lens module 100, the supporting member 40 is arranged to wrap the sensor 20 on the soft board 12, reducing the risk of foreign matter from outside the circuit board 10 entering the channel 13.

In the embodiment, the sensor 20 is connected to the part of the soft board 12 located in the channel 13, and the connecting line (not shown in the figures) connecting the sensor 20 is bonded to the two hard boards 11, for a connection between the soft board 12 and the hard board 11.

Referring to FIG. 2, in some embodiments, the first supporting portion 41, the second supporting portion 42, and the third supporting portion 43 are integral structures, to increase the strength of support of the supporting member 40, thereby improving the mechanical strength of the circuit board 10. Optionally, the supporting member 40 is made of steel.

In some embodiments, the first supporting portion 41 defines a first side surface 411 and a second side surface 412, and the first side surface 411 and the second side surface 412 are arranged in opposite directions in the third direction Y. The second supporting portion 42 is connected to the first side surface 411, the third supporting portion 43 is connected to the second side surface 412, and the third direction Y is perpendicular to the first direction X and the second direction Z.

In some embodiments, the first side surface 411 has a first groove 4111 recessed toward the second side surface 412. One end of the second supporting portion 42 is connected to the groove wall of the first groove 4111, and the other end of the second supporting portion 42 extends towards the channel 13, one end of the second supporting portion 42 away from the first supporting portion 41 is partially exposed outside the channel 13.

In some embodiments, the second side surface 412 has a second groove 4121 recessed toward the first side surface 411. One end of the third supporting portion 43 is connected to the groove wall of the second groove 4121, and the other end of the third supporting portion 43 extends towards the channel 13, one end of the third supporting portion 43 away from the first supporting portion 41 is partially exposed outside the channel 13.

The second supporting portion 42 is connected to the first groove 4111, the third supporting portion 43 is connected to the second groove 4121, and the second supporting portion 42 and the third supporting portion 43 extend into the channel 13, thus the second supporting portion 42 faces the side of the third supporting portion 43, and the third supporting portion 43 faces the side of the second supporting portion 42 and the side opposite to the two hard boards 11 to wrap around the four sides of the sensor 20. This reduces the size of the lens module 100 in the third direction Y, protects the sensor 20 located in the channel 13, and reduces the risk of foreign objects entering the channel 13 and contaminating the sensor 20.

Figure 5:
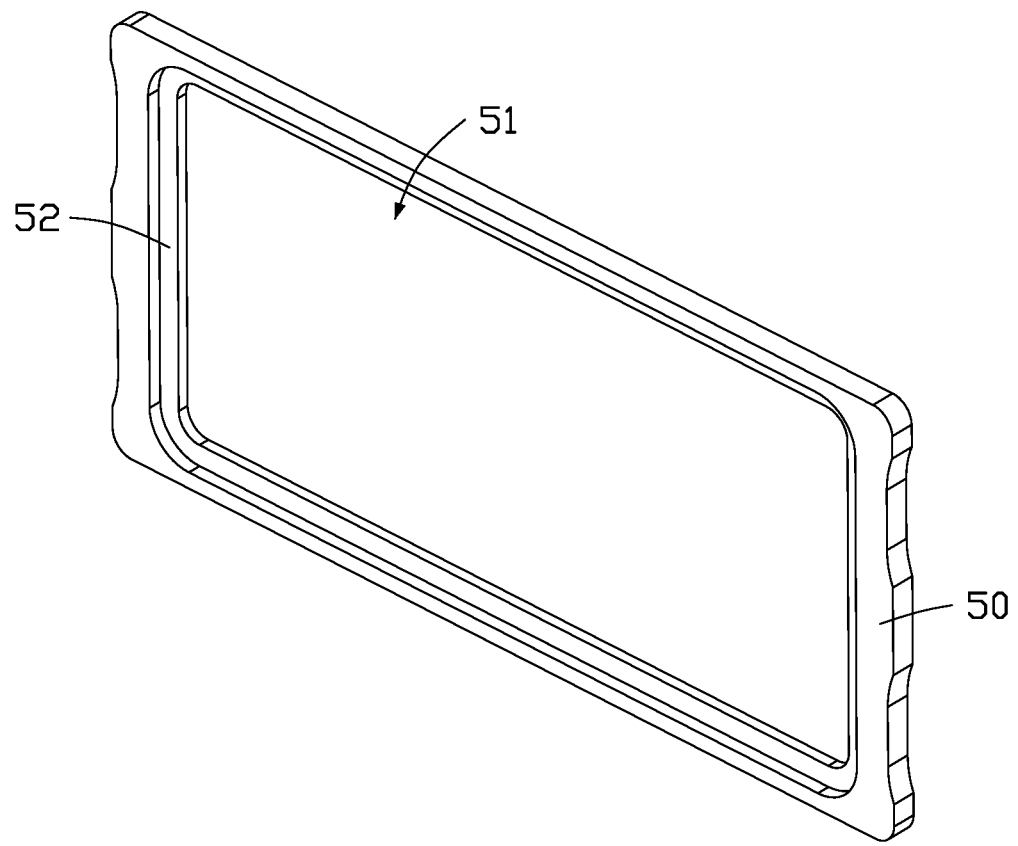
FIG. 5 is a schematic diagram of a first connecting member according to an embodiment of the present disclosure.

Referring to FIG. 2 and FIG. 5, in some embodiments, the lens module further includes a first connecting member 50. The first connecting member 50 is arranged between the lens assembly 30 and the hard board 11 for connecting the lens assembly 30 and the hard board 11. The first connecting member 50 defines a through hole 51, the through hole 51 communicates with the channel 13. The sensor 20 receives light passing through the lens assembly 30 by setting the through hole 51 on the first connecting member 50, and the light is converted into an electrical signal and an image is generated.

In some embodiments, a portion of the hole wall of the through hole 51 near the lens assembly 30 protrudes to form a holding portion 52, one end of the second supporting portion 42 and the third supporting portion 43 away from the first supporting portion 41 is held in the holding portion 52. In the disclosure, the holding portion 52 can be set at the part of the through hole 51 close to the lens assembly 30. When the second supporting portion 42 and the third supporting portion 43 pass through the channel 13 and extend into the first connecting member 50 to hold the holding portion 52, they then wrap the sensor 20 inside the channel 13.

Referring to FIG. 2, in some embodiments, the lens assembly 30 includes a holder 31, a camera lens 32, an optic lens 33. The holder 31 is connected to the hard board 11 through the first connecting member 50, the camera lens 32 is connected to the end of the holder 31 far from the hard board 11, and the optic lens 33 is arranged on the side of the holder 31 towards the hard board 11. The camera lens 32 and the optic lens 33 are arranged in the second direction Z opposite each other.

In some embodiments, the lens module 100 also includes a second connecting member 60, the second connecting member 60 is arranged between the sensor 20 and the soft board 12 to connect the sensor 20 and the soft board 12. In this embodiment, the second connecting member 60 may be, but is not limited to, an adhesive layer.

Figure 6:
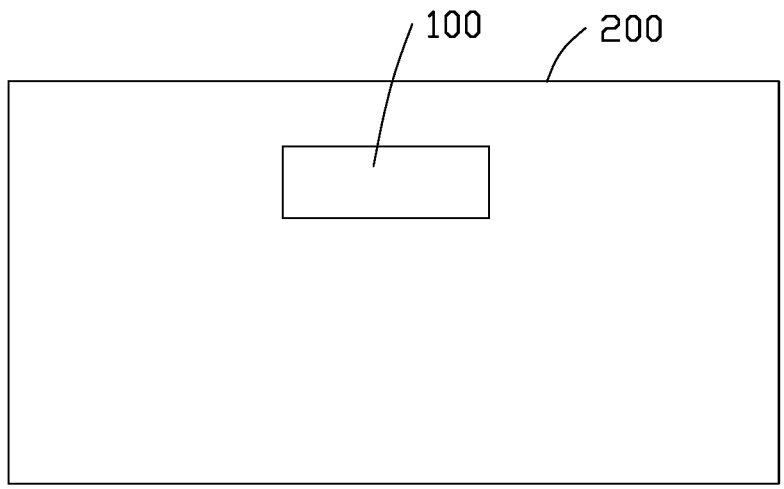
FIG. 6 is a schematic diagram of an electronic device according to an embodiment of the present disclosure.

FIG. 6 illustrates an electronic device sensor 200 in accordance with an embodiment of the present disclosure. The electronic device 200 can include the lens module 100 described in the above embodiments.

In some embodiments, the electronic device 200 of the present disclosure may be, but is not limited to, a mobile phone, a wearable device, a vehicle, a camera, or a monitoring device.

Those of ordinary skill in the art should realize that the above embodiments are only used to illustrate the present disclosure, and not to limit the present disclosure. As long as they are within the essential spirit of the present disclosure, the above embodiments are appropriately made and changes fall within the scope of protection of the present disclosure.

What is claimed is:

1. A lens module comprising:
    a circuit board comprising two hard boards and a soft board; wherein the two hard boards are spaced apart in a first direction, and a channel is formed between adjacent ends of the two hard boards, each of the two hard boards comprises a first surface and a second surface, the first surface and the second surface are relatively arranged in a second direction, and the soft board is connected to the first surface of the two hard boards and is suspended across the channel;
    a sensor located in the channel and connected to a side of the soft board towards the channel;
    a lens assembly connected to the second surface of the two hard boards; wherein the lens assembly and the sensor are arranged in the second direction, and the first direction is perpendicular to the second direction; and
    a supporting member connected to the circuit board; wherein the supporting member comprises a first supporting portion, a second supporting portion, and a third supporting portion, the first supporting portion is connected to a side of the soft board away from the first surface, and the second supporting portion is connected to a side of the first supporting portion and extends into the channel, the third supporting portion is connected to another side of the first supporting portion and extends into the channel, and the sensor is arranged between the second supporting portion and the third supporting portion.

2. The lens module of claim 1, wherein the first supporting portion comprises a first side surface and a second side surface, the first side surface and the second side surface are arranged in a third direction, the second supporting portion is connected to the first side surface, the third supporting portion is connected to the second side surface, and the third direction is perpendicular to the first direction and the second direction.

3. The lens module of claim 2, wherein the first side surface defines a first groove recessed toward the second side surface, one end of the second supporting portion is connected to a groove wall of the first groove, and another end of the second supporting portion is extended toward the channel, one end of the second supporting portion away from the first supporting portion is exposed out of the channel, the second side surface defines a second groove recessed toward the first side surface, and one end of the third supporting portion is connected to a groove wall of the second groove, another end of the third supporting portion extends toward the channel, and one end of the third supporting portion away from the first supporting portion is exposed out of the channel.

4. The lens module of claim 3, wherein the second supporting portion and the third supporting portion are located in the channel.

5. The lens module of claim 3, wherein the lens module further comprises a first connecting member, the first connecting member is arranged between the lens assembly and the two hard boards to connect the lens assembly and each of the two hard boards, the first connecting member defines a through hole communicating to the channel, and the sensor transmits signals to the lens assembly via the through hole.

6. The lens module of claim 5, wherein a portion of a hole wall of the through hole close to the lens assembly protrudes to form a holding portion, and one end of the second supporting portion and one end of the third supporting portion away from the first supporting portion are held in the holding portion.

7. The lens module of claim 5, wherein the lens assembly comprises a holder, a camera lens and an optic lens, the holder is connected to each of the two hard boards through the first connecting member, the camera lens is connected to one end of the holder away from each of the two hard boards, the optic lens is arranged on one side of the holder facing the hard boards, and the camera lens and the optic lens are arranged in a second direction.

8. The lens module of claim 1, wherein the lens module further comprises a second connecting member, the second connecting member is arranged between the sensor and the soft board, the second connecting member connecting the sensor to the soft board.

9. The lens module of claim 1, wherein the first supporting portion, the second supporting portion and the third supporting portion are integrally formed.

10. An electronic device comprising:
a lens module comprising:
a circuit board comprising two hard boards and a soft board; wherein the two hard boards are spaced apart in a first direction, and a channel is formed between adjacent ends of the two hard boards, each of the two hard boards comprises a first surface and a second surface, the first surface and the second surface are relatively arranged in a second direction, and the soft board is connected to the first surface of the two hard boards and is suspended across the channel;
a sensor located in the channel and connected to a side of the soft board towards the channel;
a lens assembly connected to the second surface of the two hard boards; wherein the lens assembly and the sensor are arranged in the second direction, and the first direction is perpendicular to the second direction; and
a supporting member connected to the circuit board; wherein the supporting member comprises a first supporting portion, a second supporting portion, and a third supporting portion, the first supporting portion is connected to a side of the soft board away from the first surface, and the second supporting portion is connected to a side of the first supporting portion and extends into the channel, the third supporting portion is connected to another side of the first supporting portion and extends into the channel, and the sensor is arranged between the second supporting portion and the third supporting portion.

11. The electronic device of claim 10, wherein the first supporting portion comprises a first side surface and a second side surface, the first side surface and the second side surface are arranged in a third direction, the second supporting portion is connected to the first side surface, the third supporting portion is connected to the second side surface, and the third direction is perpendicular to the first direction and the second direction.

12. The electronic device of claim 11, wherein the first side surface defines a first groove recessed toward the second side surface, one end of the second supporting portion is connected to a groove wall of the first groove, and another end of the second supporting portion is extended toward the channel, one end of the second supporting portion away from the first supporting portion is exposed out of the channel, the second side surface defines a second groove recessed toward the first side surface, and one end of the third supporting portion is connected to a groove wall of the second groove, other end of the third supporting portion extends toward the channel, and one end of the third supporting portion away from the first supporting portion is exposed out of the channel.

13. The electronic device of claim 12, wherein the second supporting portion and the third supporting portion are located in the channel.

14. The electronic device of claim 12, wherein the lens module further comprises a first connecting member, the first connecting member is arranged between the lens assembly and the two hard boards to connect the lens assembly and each of the hard boards, the first connecting member defines a through hole communicating to the channel, and the sensor transmits signals to the lens assembly via the through hole.

15. The electronic device of claim 14, wherein a portion of a hole wall of the through hole close to the lens assembly protrudes to form a holding portion, and one end of the second supporting portion and one end of the third supporting portion away from the first supporting portion are held in the holding portion.

16. The electronic device of claim 14, wherein the lens assembly comprises a holder, a camera lens and an optic lens, the holder is connected to each of the two hard boards through the first connecting member, the camera lens is connected to one end of the holder away from each of the two hard boards, the optic lens is arranged on one side of the holder facing the hard boards, and the camera lens and the optic lens are arranged in a second direction.

17. The electronic device of claim 10, wherein the lens module further comprises a second connecting member, the second connecting member is arranged between the sensor and the soft board, the second connecting member connecting the sensor to the soft board.

18. The electronic device of claim 10, wherein the first supporting portion, the second supporting portion and the third supporting portion are integrally formed.

* * * * *